Figure 1:
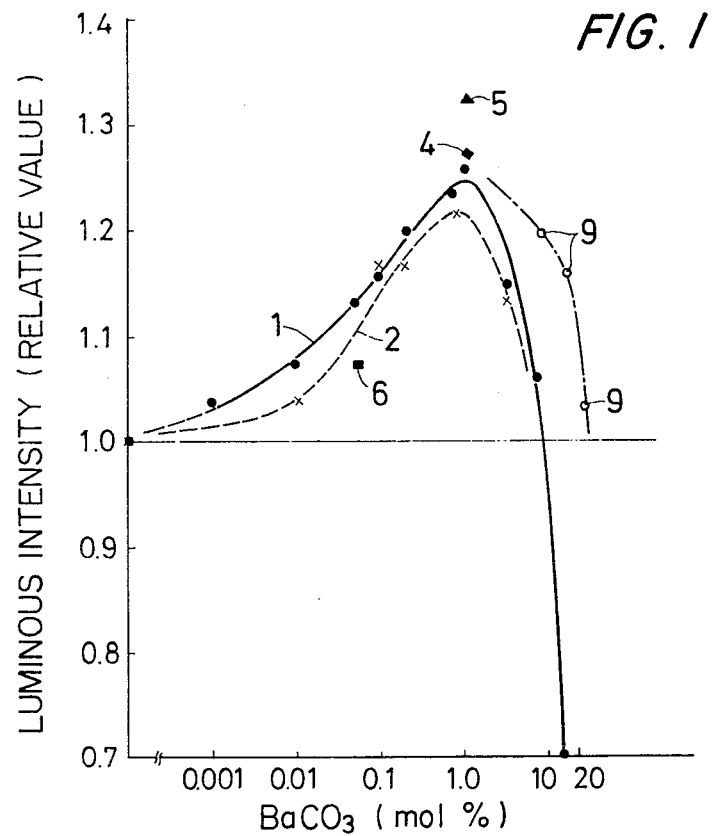

United States Patent [19]

Tomiki et al.

[11] 4,070,301

[45] Jan. 24, 1978

[54] METHOD OF PREPARING CERIUM-ACTIVATED YTTRIUMALUMINATE PHOSPHOR OF IMPROVED EFFICIENCY

[75] Inventors: Tetsuhiko Tomiki; Takeshi Takeda; Takeo Miyata; Fumio Muramatsu, all of Kawasaki, Japan

[73] Assignee: Matsushita Electric Industrial Co., Ltd., Kawasaki, Japan

[21] Appl. No.: 691,784

[22] Filed: June 1, 1976

[30] Foreign Application Priority Data

June 2, 1975 Japan .................................. 50-66824

[51] Int. Cl.$^2$ ............................................. C09K 11/46
[52] U.S. Cl. ............................................. 252/301.4 R
[58] Field of Search ................................. 252/301.4 R

[56] References Cited

U.S. PATENT DOCUMENTS

| | | | |
|---|---|---|---|
| 2,590,411 | 3/1952 | Isenberg | 252/301.4 R X |
| 3,623,994 | 11/1971 | Martin | 252/301.4 R |

FOREIGN PATENT DOCUMENTS

| | | | |
|---|---|---|---|
| 2,409,953 | 9/1974 | Germany | 252/301.4 R |
| 1,174,518 | 12/1969 | United Kingdom | 252/301.4 R |
| 1,371,207 | 10/1974 | United Kingdom | 252/301.4 R |

OTHER PUBLICATIONS

Koga I "Chem. Abstracts", vol. 81, 1974, 97027.
Koga II "Chem. Abstracts", vol. 81, 1974, 97664c.

*Primary Examiner*—Jack Cooper
*Attorney, Agent, or Firm*—Lowe, King, Price & Markva

[57] ABSTRACT

A cerium-activated yttriumaluminate phosphor such as $YAlO_3$:Ce featuring an enhanced luminous intensity is produced by adding a barium compound exemplified by $BaO$, $BaCO_3$, $Ba(OH)_2$ and $BaF_3$ to a mixture of source materials of the host material and the activator and baking the resulting mixture at a usual temperature ranging from 1000° to 1400° C. The barium compound preferably amounts to 0.001–8 mol% of the yttriumaluminate and may alternatively be introduced into a preliminarily baked and pulverized mixture of the source materials.

7 Claims, 2 Drawing Figures

METHOD OF PREPARING CERIUM-ACTIVATED YTTRIUMALUMINATE PHOSPHOR OF IMPROVED EFFICIENCY

This invention relates to a phosphor which is an yttriumaluminum oxide activated by trivalent cerium, and more particularly to a method of producing a ceriumactivated yttriumaluminate phosphor which exhibits an improved luminous intensity.

Phosphors for use in the phosphor screens of flying-spot scanner tubes and color image receiving tubes of the index type are required to exhibit a high conversion efficiency under cathode-ray excitation and a short decay time of the emission. Among commercial phosphors, those which contain trivalent cerium as an activator generally meet such requirements. Examples are $Ca_2MgSi_2O_7$:Ce phosphor which is designated as P16, $Y_2SiO_5$:Ce phosphor (P47) and $Y_3Al_5O_{12}$:Ce phosphor (P46). In addition, a cerium-activated yttrium-orthoaluminate phosphor (which will hereinafter be referred to as $YAlO_3$:Ce phosphor) featuring a very short decay time has been disclosed, for example, in the following Japanese Patent Applications: Publication Nos. 48-31831 and 49-3913, and Disclosure No. 48-26686. $Y_4Al_2O_9$ also gives a phosphor when activated by Ce.

These cerium-activated phosphors emit light in the ultraviolet to visible spectral ranges when excited by an electron beam. Peak wavelengths in the spectral-energy distributions of P16, P47 and P46 are about 370 nm, about 420 nm and about 540 nm, respectively. $YAlO_3$:Ce phosphor emits ultraviolet light with a peak wavelength of about 370 nm and exhibits a decay time of tens of nanoseconds. This phosphor is usually superior to phosphors of different types such as P47 in shortness of the decay time but inferior in the conversion efficiency.

It is an object of the present invention to provide a method of producing a cerium-activated yttriumaluminate phosphor which exhibits an enhanced luminous efficiency compared with a conventional phosphor of the same host material with no sacrifice of other important properties.

It is another object of the invention to provide a cerium-activated yttriumaluminate phosphor featuring a short decay time and an enhanced luminous intensity.

According to a method of the invention, an improved cerium-activated yttriumaluminate phosphor is produced by the steps of (a) preparing a mixture of source materials of an yttriumaluminate as the host material of the phosphor and a cerium compound as the source of the activator, (b) adding a barium compound into the mixture, and (c) baking the resulting mixture at a temperature in the range from about 1000° to about 1400° C.

The mixture prepared at the step (a) may be baked at a temperature below about 1150° C and then pulverized prior to the step (b).

The barium compound for use in a method of the invention is selected from BaO, $BaCO_3$, $BaF_2$, $BaCl_2$, and barium salts such as $Ba(NO_3)_2$, $Ba(OH)_2$ and $BaC_2O_4$ which give BaO at a temperature below 1400° C. The barium compound is added to the mixture prepared at the step (a) preferably in an amount of 0.001 to 8 mol% of the source materials of the yttriumaluminate. A range from about 0.05 mol% to about 3 mol% is most advantageous for enhancing the luminous intensity of the phosphor. However, it is permissible to increase the amount of the barium compound up to 20 mol% of the source materials by the provision of an additional step of washing the phosphor obtained at the step (c) with nitric acid.

A phosphor according to the invention is produced by a method of the invention and comprises an yttriumaluminate as the host material and cerium as an activator. The concentration of cerium in the phosphor of the invention is in the range from 0.1 to 5 mole% as in conventional cerium-activated yttriumaluminate phosphors.

Typical examples of yttriumaluminate as the host material of a phosphor according to the invention are $YAlO_3$, $Y_3Al_5O_{12}$ and $Y_4Al_2O_9$.

The advantage of a phosphor according to the invention and particulars of a production method according to the invention will fully be understood from the following examples. Throughout these examples, $YAlO_3$:Ce phosphor was taken as a representative of yttriumaluminum oxide phosphors. The source materials of the host material and the activator in these examples are not limitative. Any of the source materials useful for the production of conventional cerium-activated yttriumaluminate phosphors is useful for a production method according to the invention.

Figure 2:
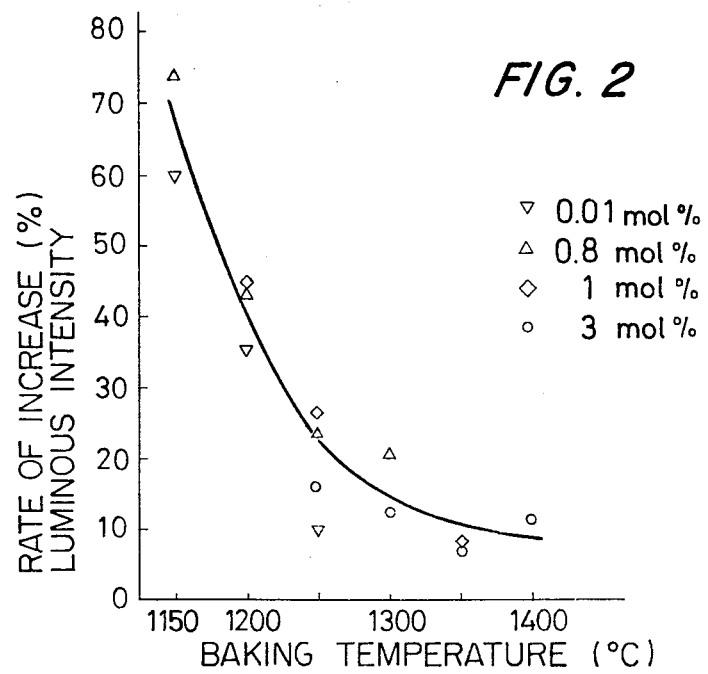

In the accompanying drawings:

FIg. 1 is a graph showing the dependence of the luminous intensity of a phosphor according to the invention on the amount of a barium compound added to the source materials of the phosphor; and FIG. 2 is a graph showing the dependence of the luminous intensity of the same phosphor on the baking temperature in the production of the phosphor.

EXAMPLE 1

The raw materials of the phosphor were 99.999% yttrium oxide $Y_2O_3$, 99.999% aluminum oxide $Al_2O_3$ and 99.99% ceric fluoride $CeF_3$. Barium carbonate $BaCO_3$ of a special class reagent grade was used as the barium compound. These materials were weighed in the following quantities with corrections for ignition losses:

| | |
|---|---|
| $Y_2O_3$ | 0.495 moles |
| $Al_2O_3$ | 0.500 moles |
| $CeF_3$ | 0.010 moles |
| $BaCO_3$ | x moles | the value of x was taken as 0, 0.00001, 0.0001, 0.0005, 0.001, 0.002, 0.008, 0.01, 0.03, 0.08 and 0.15 to produce eleven kinds of phosphors.

The weighed materials were immersed in ethyl alcohol and subjected to a 4 hr mixing in the wet state by the use of a ball mill. After drying, the mixture was placed in a platinum crucible and fired at 1250° C for 4 hr to produce a phosphor.

The emission characteristics of the thus prepared phosphors were examined by using one phosphor which was prepared from the mixture containing no $BaCO_3$ (x=0) as a reference. The addition of $BaCO_3$ to the mixture of the source materials ($Y_2O_3$, $Al_2O_3$ and $CeF_3$) caused practically no change in the spectral energy distribution of the luminescence of the $YAlO_3$:Ce phosphor but significantly affected the intensity of the luminescence. In the graph of FIG. 1, the curve 1 shows the relationship between the amount of $BaCO_3$ and the luminous intensity observed on the phosphors of this example. The amount of the added $BaCO_3$ on the abscissa is given in mol% of the reference phosphor. The values on the ordinate stand for the luminous intensity scaled by the intensity of the reference phosphor.

As seen from the curve 1, the phosphors prepared by the addition of $0.001 - 8$ mol% ($x = 0.00001 - 0.08$) of $BaCO_3$ to the mixture of the source materials of $YAlO_3$:Ce emitted light more intensely than the reference phosphor. The increase in the luminous intensity was by more than 15% when the amount of the used $BaCO_3$ was from 0.05 to 3 mol% ($x = 0.0005 = 0.03$), and the maximum luminous intensity which was as great as about 125% of the intensity for the reference phosphor was observed when 1.0 mol% ($x = 0.01$) of $BaCO_3$ was used. The luminous intensity decreased, however, when more than about 10 mol% ($x = 0.1$) $BaCO_3$ was used. In this respect, we have discovered that an increase in the luminous intensity can be attained even when a larger amount of $BaCO_3$ is used by the employment of an acid washing procedure subsequently to the baking procedure as will hereinafter be illustrated by a separate example.

EXAMPLE 2

This example was generally similar to Example 1 except that the baking temperature for the fabrication of the phosphors was 1300° C and that $BaCO_3$ was added to the mixture of the source materials in five different quantities: $x = 0.0001, 0.001, 0.002, 0.008$ and 0.03 moles. The relative luminous intensities of the resulting phosphors are presented as the curve 2 in the graph of FIG. 1. As seen, the curve 2 is almost identical with the curve 1 except for a slight and general deviation towards the lower side.

EXAMPLE 3

Also this example was generally similar to Example 1 except that the baking was carried out at 1200° C and that only two kinds of phosphors were prepared respectively by the employment of two values of $x$, i.e. 0 and 0.01 (1 mol%). The luminous intensity of one of these phosphors prepared by the use of $BaCO_3$ was greater than that of the other by about 45%.

EXAMPLE 4

BaO was used in place of $BaCO_3$. Other materials and the preparation method were the same as in Example 1. BaO was added to the mixture of $Y_2O_3$, $Al_2O_3$ and $CeF_3$ powders to amount to 1 mol% ($x = 0.01$). The luminous intensity of the obtained phosphor was greater than that of the reference phosphor in Example 1 by about 28% as shown in the graph of FIG. 1 by the mark 4.

EXAMPLE 5

Example 4 was repeated except that BaO was replaced by the same amount (1 mol%) of $BaF_2$. A resulting phosphor exhibited an increase of about 33% in the luminous intensity compared with the reference phosphor in Example 1. The mark 5 in FIG. 1 represents the phosphor of this example.

EXAMPLE 6

$Ba(OH)_2$ was added to the mixture of the source materials of Example 1 in place of $BaCO_3$ to amount to 0.05 mol% ($x = 0.0005$), and a phosphor was prepared by the process of Example 1. This phosphor exhibited an increase of about 5% in the luminous intensity than the reference phosphor in Example 1 as plotted in FIG. 1 by the mark 6.

EXAMPLE 7

The same materials as in Example 1 were mixed in a different manner in this example. Initially, $Y_2O_3$, $Al_2O_3$ and $CeF_3$ were weighed in accordance with Example 1 and subjected to a 4 hr ball mill mixing in an ethanol wet state followed by drying. The mixture was placed in a platinum crucible and heated at 1000° C in air for 2 hr. Then the mixture was cooled to the vicinity of room temperature. $BaCO_3$ was added to the thus preheated mixture of $Y_2O_3$, $Al_2O_3$ and $CeF_3$ in the same amounts (0, 0.001-15 mol%) as in Example 1. Thereafter the wet mixing for 4 hr and baking at 1250° C for 4 hr were carried out to prepare eleven kinds of phosphors. The relationship between the amount of the used $BaCO_3$ and the luminous intensity on the thus prepared phosphors was generally similar to the relationship represented by the curve 1 in the graph of FIG. 1.

EXAMPLE 8

This example illustrates the influence of the baking temperature in the preparation of a phosphor on the luminous intensity of the phosphor. The raw materials nd the mixing procedure were the same as in Example 1. $BaCO_3$ was added to the mixture of the source materials in five different amounts: $x = 0$, $x = 0.0001$ (0.01 mol%), $x = 0.008$ (0.8 mol%), $x = 0.01$ (1.0 mol%) $x = 0.03$ (3 mol%). The baking temperature was varied within the range from 1150° to 1400° C. This temperature range is commonly used for the preparation of the $YAlO_3$:Ce phosphor. The baking time was constantly 4 hr.

The luminous intensity of the phosphors prepared at each baking temperature using $BaCO_3$ was measured relatively to that of the phosphor prepared at the same baking temperature without using $BaCO_3$. At every baking temperature within the range from 1150° to 1400° C, the use of $BaCO_3$ resulted in an increase in the luminous intensity. The rate of increase was in dependence on both the baking temperature and the amount of the used $BaCO_3$ as shown by the graph of FIG. 2. The ordinate of the graph represents in percentage the ratio of the luminous intensity difference between a phosphor obtained from a mixture containing $BaCO_3$ and another phosphor obtained from a mixture containing no barium compound at the same baking temperature to the luminous intensity of the latter phosphor. The improving effect on the luminous intensity of the presence of $BaCO_3$ in the mixture of the source materials became less pronounced as the baking temperature was raised, but an improvement of about 10% was accomplished even at the maximum baking temperature of 1400° C. The rate of increase in the luminous intensity was as high as about 70% when the baking temperature was 1150° C.

We have confirmed that the lowering in the rate of increase in the luminous intensity with increase in the baking temperature can be suppressed by shortening the baking time. When the $BaCO_3$-containing mixtures of the source materials of Example 8 were baked at 1400° C for only 15 min (the baking time was constantly 4 hr in Example 8), the rate of increase in the luminous intensity was as high as about 40%: a baking condition of 1200° C × 4 hr and a different baking condition of 1400° C × 0.25 hr afforded the phosphors luminous intensities on the same level. The duration of the keep time at the baking temperature affects the magnitude of the rate of increase in the luminous intensity resulting from the use of a barium compound but does not fundamentally govern the improving effect of the barium compound on the luminous intensity. An increase in the luminous intensity can be attained irrespective of the baking time so long as the baking time is within the range from about 15 min to about 10 hr. A practicable minimum baking temperature is about 1000° C. It is preferable, however, to employ a baking temperature in the range from 1150° to 1400° C and select the baking time within the range from about 15 min to about 4 hr.

As is known, a phosphor prepared by baking powdered materials is sometimes pulverized and baked once more to improve the properties of the phosphor. The Ba-containing phosphors prepared in the foregoing examples retained their increased luminous inteisities even when they were subjected to such an additional baking process.

EXAMPLE 9

Three kinds of phosphors were prepared in accordance with Example 1 by using 8 mol% ($x = 0.08$), 15 mol% ($x = 0.15$) and 20 mol% ($x = 0.20$) of $BaCO_3$, respectively. These phosphors were washed with a diluted nitric acid of about 5 N for 30 – 60 min followed by washing with water. The luminous intensity was examined on the thus treated phosphors in the same manner as in Example 1. The relative values of the observed intensities are presented in FIG. 1 as the three marks 9.

This Example illustrates that the rate of increase in the luminous intensity resulting from the use of more than about 1 mol% of a barium compound can be enhanced by washing the phosphor with nitric acid and that the increase is attainable even when the barium compound is used in an amount of 10 to 20 mol%.

The use of a relatively large amount of a barium compound with the provision of the above described nitric acid washing has the advantage that a resulting phosphor of the same luminous intensity as another phosphor obtained by the use of a smaller amount of the same barium compound exhibits a shorter decay time.

The concentration of Ce as the activator in the phosphors of the foregoing examples was constantly 1 mol%. The above described enhacing effect on the luminous intensity of the use of a barium compound was confirmed also on phosphors of the same type with different Ce concentrations within the range from 0.01 to 5 mol%. The Ce concentration in known yttriumaluminum oxide phosphors lies almost always within this range, so that the use of a barium compound according to the invention is effectively applicable to the phosphors of the described type practically regardless of the Ce concentration. An increase in the luminous intensity resulting from the use of a barium compound is observed even when the Ce concentration in the phosphor is either less than 0.01 mol% or more than 5 mol%, but the improved luminous intensity of the phosphor with such Ce concentrations is still too low in absolute value to render the phosphor practically useful.

$YAlO_3$:Ce phosphor was used not as a sole object of the invention in the foregoing examples but as a representative of cerium-activated yttriumaluminum oxide phosphors. The effectiveness of the use of a barium compound in increasing the luminous intensity was confirmed also on $Y_3Al_5O_{12}$:Ce (P46) and $Y_4Al_2O_9$:Ce phosphors. The invention is effectively applicable to any of a group of phosphors which are composed of yttrium, aluminum and oxygen and activated by cerium.

The mixing time of 4 hr in the examples is not limitative. As in the production of cerium-activated yttriumaluminate phosphors by conventional methods, the mixing time can be varied in a wide range. In general, relatively lower baking temperatures can be employed when the mixing is carried out for long hours as is known in the art.

A phosphor according to the invention features not only a high luminous intensity but also a short decay time, so that the phosphor is particularly suitable for use in flying-spot scanner tubes and color image receiving tubes of the index type.

What is claimed is:

1. A method of producing a phosphor comprising yttrium aluminate activated by cerium, the atomic ratio of yttrium to aluminum in the phosphor being substantially 1:1, the method comprising the steps of:
   a. preparing a mixture of $Y_2O_3$, $Al_2O_3$ and $CeF_3$, the molar ratio of $Y_2O_3$ to $Al_2O_3$ being substantially 1:1, the quantity of $CeF_3$ being such that cerium amounts to 0.1 to 5 mol % of said yttrium aluminate;
   b. adding a barium compound selected from the group consisting of $BaO$, $BaCO_3$, $BaF_2$, $BaCl_2$ and barium salts which yield $BaO$ at a temperature below 1400° C. and selected from the group consisting of $Ba(NO_3)_2$, $Ba(OH)_2$ and $BaC_2O_4$, to said mixture in an amount of 0.001 to 20 mol % of said mixture;
   c. baking the resultant mixture at a temperature in the range from about 1000° to about 1400° C.; and
   d. washing the product of step (c) with nitric acid when said amount of said barium compound is larger than 8 mol %.

2. A method as claimed in claim 1, wherein step (c) is carried out at a temperature in the range of from about 1150° to about 1400° C.

3. A method as claimed in claim 2 further comprising the step of baking said mixture prepared at step (a) at a temperature below 1150° and then pulverizing the baked mixture prior to step (b).

4. A method of producing a phosphor comprising yttrium aluminate activated by cerium, the atomic ratio of yttrium to aluminum in the phosphor being substantially 1:1, the method comprising the steps of:
   a. preparing a mixture of $Y_2O_3$, $Al_2O_3$ and $CeF_3$, the molar ratio of $Y_2O_3$ to $Al_2O_3$ being substantially 1:1, the quantity of $CeF_3$ being such that cerium amounts to 0.1 to 5 mol % of said yttrium aluminate;
   b. adding a barium compound selected from the group consisting of $BaO$, $BaCO_3$, $BaF_2$, $BaCl_2$ and barium salts which yield $BaO$ at a temperature below 1400° C. and selected from the group consisting of $Ba(NO_3)_2$, $Ba(OH)_2$ and $BaC_2O_4$, to said mixture in an amount of 0.001 to 8 mol % of said mixture; and
   c. baking the resultant mixture at a temperature in the range from about 1000° to about 1400° C.

5. A method as claimed in claim 4, wherein step (c) is carried out at a temperature in the range of from about 1150° to about 1400° C.

6. A method as claimed in claim 4 further comprising the step of baking said mixture prepared at step (a) at a temperature below 1150° and the pulverizing the baked mixture prior to step (b).

7. A method as claimed in claim 4, wherein said barium compound is in the range of about 0.05 to 3 mol %.

* * * * *